United States Patent
Ali et al.

(10) Patent No.: US 11,064,704 B2
(45) Date of Patent: Jul. 20, 2021

(54) NATURAL PRODUCT FORMULATIONS WITH IMPROVED RESIDUAL INSECT REPELLENT/DETERRENT ACTIVITY

(71) Applicant: University of Mississippi, University, MS (US)

(72) Inventors: Abbas Ali, Oxford, MS (US); Ikhlas A. Khan, Oxford, MS (US); Mohamed Mahmoud Radwan, Oxford, MS (US)

(73) Assignee: University of Mississippi, University, MS (US)

( * ) Notice: Subject to any disclaimer, the term of this patent is extended or adjusted under 35 U.S.C. 154(b) by 0 days.

(21) Appl. No.: 16/343,567

(22) PCT Filed: Oct. 20, 2017

(86) PCT No.: PCT/US2017/057731
§ 371 (c)(1),
(2) Date: Apr. 19, 2019

(87) PCT Pub. No.: WO2018/075969
PCT Pub. Date: Apr. 26, 2018

(65) Prior Publication Data
US 2020/0045982 A1    Feb. 13, 2020

Related U.S. Application Data

(60) Provisional application No. 62/411,239, filed on Oct. 21, 2016.

(51) Int. Cl.
| | |
|---|---|
| *A01N 65/10* | (2009.01) |
| *A01N 31/06* | (2006.01) |
| *A01N 37/06* | (2006.01) |
| *A01N 37/18* | (2006.01) |

(52) U.S. Cl.
CPC ............ *A01N 65/10* (2013.01); *A01N 31/06* (2013.01); *A01N 37/06* (2013.01); *A01N 37/18* (2013.01)

(58) Field of Classification Search
CPC .................................................... A01N 65/00
See application file for complete search history.

(56) References Cited

U.S. PATENT DOCUMENTS 7,381,431 B2 * 6/2008 Baker .................... A01N 65/22
424/725

FOREIGN PATENT DOCUMENTS

| WO | WO 2008/056365 A2 | 5/2008 | |
|---|---|---|---|
| WO | WO-2008056365 A2 * | 5/2008 | ............. A61K 36/23 |

OTHER PUBLICATIONS

Ali, A. et al. "Aedes aegypti (*Diptera*:Culicidae) biting deterrence: structure-activity relationship of saturated and unsaturated fatty acids", J. of Medical Entomology, 2012, vol. 49, No. 6. 1368-1378. (Year: 2012).*
IN1750DEL2007 (Nair et al.) Jan. 1, 2010, p. 4, ln. 11, 21-24; p. 5, ln. 15; p. 13, ln. 3; p. 13-14, Table 2.
Halford, "Breadfruit Battles Mosquitoes", Concentrates, vol. 90, Issue 16, p. 40, Apr. 16, 2012, Abstract.
Park et al., "Larvicidal activity of Amyris balsamifera, Daucus carota and Pogostemon cablin essential oils and their components against Culex pipiens pallens", Journal of Asia-Pacific Entomology. vol. 15, Issue 4, Dec. 2012, pp. 631-634, Abstract.
International Search Report in International Application No. PCT/US2017/057731, dated Jan. 10, 2018.
Written Opinion in International Application No. PCT/US2017/057731, dated Jan. 10, 2018.

* cited by examiner

*Primary Examiner* — Gina C Justice
(74) *Attorney, Agent, or Firm* — Thomas|Horstemeyer, LLP

(57) ABSTRACT

Natural products were screened for their insect repellent activity, and carrot seed essential oil gave very high activity in biting repellent/deterrent bioassays. Analysis of the oil revealed the presence of 47 compounds, mainly mono- and sesqui-terpenes. The sesquiterpene, carotol, constituted more than 75% w/w of the oil. In the initial screening, the essential oil gave high biting deterrent activity and high repellent activity comparable to DEET against both *Aedes aegypti* and *Anophies quadrimaculatus* species of mosquitoes. The active fraction mainly comprises pure carotol. The essential oil and the pure compound have a potential to be developed and used as effective repellent against mosquitoes.

6 Claims, 21 Drawing Sheets

Table 1. $^1$H and $^{13}$C NMR spectroscopic data for carotol (CDCl$_3$, 400 MHz)

| Position | $\delta_c$ | $\delta_H$ (mult., $J$ in Hz) |
|---|---|---|
| 1 | 49.1 | - |
| 2 | 38.7 | 1.69 m, 2.23 m |
| 3 | 122.3 | 5.29 (t, 6.0) |
| 4 | 138.9 | - |
| 5 | 29.5 | 2.05 t (5.8) |
| 6 | 34.5 | 1.93 m |
| 7 | 84.5 | - |
| 8 | 52.5 | 1.80 m |
| 9 | 24.5 | 1.65 m, 1.90 m |
| 10 | 39.5 | 1.27 m |
| 11 | 21.4 | 0.91 (s) |
| 12 | 25.3 | 1.65 (s) |
| 13 | 27.6 | 1.80 m |
| 14 | 24.1 | 0.97 d (6.0) |
| 15 | 21.5 | 0.91 (6.0) |

Fig. 1

Table 2. Major components of carrot seed essential oil from GC analysis

| Component | Area (%) | Rt (min.) | m/z | Class |
|---|---|---|---|---|
| -pinene α | 0.82 | 7.8 | 136 | monoterpene |
| 2(10) pinene | 0.46 | 9.4 | 136 | monoterpene |
| β- pinene | 0.40 | 9.8 | 136 | monoterpene |
| Limonene | 0.75 | 11.4 | 136 | monoterpene |
| Anisole | 0.37 | 23.4 | 148 | monoterpene |
| Muurolene | 4.86 | 27.5 | 204 | sesquiterpene |
| Cryophyllene | 0.5 | 29.4 | 204 | sesquiterpene |
| (z)-β-farnesene | 2.9 | 33.2 | 204 | sesquiterpene |
| Diepicedrene | 1.1 | 35.6 | 222 | sesquiterpene |
| Carotol | 75.6 | 37.56 | 222 | sesquiterpene |
| Daucol | 2.0 | 38.9 | 238 | sesquiterpene |
| Total area | 89.47 % | | | |

Fig. 2

Table 3. Biting deterrent activity of carrot seed essential oil against Ae. Aegypti.

| Treatment | N* | PNB ± SEM** |
|---|---|---|
| Ethanol | 75 | 0.36 ± 0.06 |
| DEET 25 nmol/cm² | 75 | 0.85 ± 0.04 |
| Essential oil 10 µg/cm² | 75 | 0.84 ± 0.04 |

*N is the number of females tested. **PNB is the mean proportion of females not biting and SEM is the standard error of the mean.

Fig. 3

Table 4. Biting deterrent activity of fractions of the carrot seed essential oil against Ae. Aegypti.

| Treatment | N* | PNB ± SEM** |
|---|---|---|
| Ethanol | 25 | 0.32 ± 0.05D |
| DEET 25 nmol/cm$^2$ | 25 | 0.84 ± 0.04A |
| Essential oil 10 µg/cm$^2$ | 25 | 0.88 ± 0.05A |
| F-1 10 µg/cm$^2$ | 25 | 0.64 ± 0.04BC |
| F-2 10 µg/cm$^2$ | 25 | 0.60 ± 0.06BC |
| F-3 10 µg/cm$^2$ | 25 | 0.72 ± 0.05ABC |
| F-4 10 µg/cm$^2$ | 25 | 0.52 ± 0.08CD |
| F-5 10 µg/cm$^2$ | 25 | 0.48 ± 0.05CD |
| F-6 10 µg/cm$^2$ | 25 | 0.52 ± 0.05CD |
| F-7 10 µg/cm$^2$ | 25 | 0.60 ± 0.06BC |

*N is the number of females tested. **PNB is the mean proportion of females not biting and SEM is the standard error of the mean. Means within the column not followed by the same are significantly different (Ryan-Einot-Gabriel-Welsch multiple range test P≤0.05).

Fig. 4

Table 5. Biting deterrent activity of carotol against *Ae. Aegypti.*

| Treatment | N* | PNB ± SEM** |
|---|---|---|
| Ethanol | 75 | 0.29 ± 0.05C |
| DEET 25 nmol/cm² | 75 | 0.85 ± 0.04A |
| Carotol 10 µg/cm² | 75 | 0.90 ± 0.03A |
| Carotol 5 µg/cm² | 50 | 0.66 ± 0.03 B |

*N is the number of females tested. **PNB is the mean proportion of females not biting and SEM is the standard error of the mean. Means within the column not followed by the same are significantly different (Ryan-Einot-Gabriel-Welsch multiple range test $P \leq 0.05$).

Fig. 5

Table 6. Biting deterrent activity of carrot seed essential oil and carotol against *An. quadrimaculatus*.

| Treatment | N* | PNB ± SEM** |
|---|---|---|
| Ethanol | 50 | 0.18 ± 0.02B |
| DEET 25 nmol/cm$^2$ | 50 | 0.84 ± 0.03A |
| Essential oil 10 µg/cm$^2$ | 50 | 0.84 ± 0.04A |
| Carotol 10 µg/cm$^2$ | 50 | 0.78 ± 0.04A |
| Carotol 25 nmol/cm$^2$ | 50 | 0.72 ± 0.04A |

*N is the number of females tested. **PNB is the mean proportion of females not biting and SEM is the standard error of the mean. Means within the column not followed by the same are significantly different (Ryan-Einot-Gabriel-Welsch multiple range test $P \leq 0.05$).

Fig. 6

Table 7. Residual repellent activity of DEET, carrot seed essential oil and carotol against *Aedes aegypti* females in *in vitro* A & K bioassay

| Compound | Percentage of females biting out of 200 in the cage | | |
|---|---|---|---|
| | Dose (µg/cm$^2$)$^a$ | | |
| DEET | 23.4 | 11.7 | 5.9 |
| DEET | 0$^{b*}$ | 0.3 ± 0.05 | >1 |
| Carotol | 0.03 ± 0.03 | 0.21 ± 0.05 | >1 |
| Essential oil | 0 | 0.87 ± 0.06 | >1 |

$^a$The data is from A & K bioassay using 12 cm$^2$ treated surface area. $^b$Data are %age (mean ± SEM) biting. Minimum effective dose is ≤ 1% biting which are 2 females out of 200. MED in all the treatments is 11.7 µg/cm$^2$. Data is based on 15, 30 and 30 replications for 23.4, 11.7 and 5.9 µg/cm$^2$ treatments, respectively.

Fig. 7

Table 8. Residual repellent activity of DEET, carrot seed essential oil and Carotol against *Aedes aegypti* females in an *in vitro* A & K bioassay

| Compound | Dose (μg/cm²) | No. of Reps | Percentage of females biting out of 200 in the cage |  |  |  |  |
|---|---|---|---|---|---|---|---|
| | | | Time after treatment (Min) | | | | |
| | | | 0 | 30 | 60 | 90 | 120 |
| DEET | | | 0ª | 0 | 0 | 0 | 0 |
| Carotol | 46.9 | 15 | 0 | 0 | 0 | 0.03 ± 0.03 | 0.03 ± 0.03 |
| Essential oil | | | 0 | 0.07 ± 0.05 | 0.13 ± 0.06 | 0.33 ± 0.06 | 0.8 ± 0.1 |
| DEET | | | 0 | 0 | 0 | 0.03 ± 0.03 | 0.43 ± 0.07 |
| Carotol | 23.4 | 15 | 0.03 ± 03 | 0.4 ± 0.05 | 0.57 ± 0.08 | >1 | >1 |
| Essential oil | | | 0.26 ± 0.07 | 0.16 ± 0.06 | 0.43 ± 0.07 | >1 | >1 |
| DEET | | | 0.1 ± 0.05 | 0.53 ± 0.08 | >1 | >1 | >1 |
| Carotol | 11.7 | 15 | | | | | |
| Essential oil | | | 0.87 ± 0.05 | >1 | >1 | >1 | >1 |

ªData are %age (mean ± SEM) biting. Minimum effective dose is ≤ 1% biting which are 2 females out of 200 in the cage. Data is from A & K bioassay using 12 cm² treated surface area. Residual repellent based on MED is 46.9 μg/cm² in all treatment up to 120 min, whereas at 23.4 μg/cm² this dose carotol and carrot oil crossed MED levels after 60 min post treatment.

Fig. 8

Table 9. Repellent activity of DEET, carrot seed essential oil and carotol against *Aedes aegypti* females in an *in vivo* "cloth patch" bioassay

| Compound | Percentage of females biting out of 500 in the cage | | | |
|---|---|---|---|---|
| | Dose (µg/cm$^2$) | | | |
| | 50 | 25 | 12.5 | 6.25 |
| DEET | 0.02 ± 0.01[*] | 0.14 ± 0.03 | 0.5 ± 0.04 | 1.62 ± 0.1[**] |
| Carotol | 0.13 ± 0.03 | 0.53 ± 0.04 | >1[**] | - |
| Essential oil | 0.24 ± 0.03 | 0.57 ± 0.03 | >1[**] | - |

[*]Data are in %age (mean ± SEM) biting. Minimum effective dose is ≤ 1% biting which is 5 females out of 500. MED in DEET was 12.5 µg/cm$^2$ whereas comparable MED of carotol and the essential oil is 25 µg/cm$^2$. Data is based on 25 replications for 50 and 25 µg/cm$^2$ treatments, respectively

Fig. 9

Table 10. Residual repellent activity of DEET, carrot seed essential oil and carotol against *Aedes aegypti* females in an *in vivo* "cloth patch" assay

| Compound | Dose (µg/cm²) | No. of Reps | Percentage of females biting out of 500 in the cage ||||||
|---|---|---|---|---|---|---|---|---|
| | | | Time after treatment (Min) ||||||
| | | | 0 | 30 | 60 | 90 | 120 |
| DEET | 50 | 5 | 0.04 ± 0.04* | 0.08 ± 0.05 | 0.16 ± 0.04 | 0.28 ± 0.05 | 0.28 ± 0.05 |
| Carotol | | | 0.2 ± 0.06 | 0.44 ± 0.04 | 0.64 ± 0.04 | 0.68 0.08 | 0.8 ± 0.06 |
| Essential oil | | | 0.2 ± 0.06 | 0.28 ± 0.05 | 0.44 ± 0.098 | 0.6 ± 0.06 | 0.72 ± 0.05 |
| DEET | 25 | 5 | 0.08 ± 0.05 | 0.16 ± 0.04 | 0.36 ± 0.04 | 0.48 ± 0.05 | 0.48 ± 0.05 |
| Carotol | | | 0.4 ± 0.06 | 0.44 ± 0.04 | 0.56 ± 0.07 | 0.72 ± 0.05 | 0.76 ± 0.04 |
| Essential oil | | | 0.52 ± 05 | 0.6 ± 0.0 | 0.64 ± 0.04 | 0.72 ± 0.05 | 0.92 ± 0.5 |
| DEET | 12.5 | 5 | 0.52 ± 0.1 | >1 | >1 | >1 | >1 |
| Carotol | | | >1 | | | | |
| Essential oil | | | >1 | | | | |

*Data are %age (mean ± SEM) biting. Minimum effective dose is ≤ 1% biting which are 5 females out of 500 in the cage. Residual repellency based on MED is 50 and 25 µg/cm² in all treatment up to 120 min whereas DEET was also active at 0 min at 12.5 µg/cm2

Fig. 10

Table 11. Repellent activity of DEET and carotol against *Aedes albopictus* females in an *in vivo*, cloth patch bioassay

| Compound | N[a] | Dose (μg/cm$^2$) | | |
|---|---|---|---|---|
| | | 25 | 12.5 | 6.25 |
| DEET | 5 | 0.0 ± 0[b] | 0.23 ± 0.5 | >1 |
| Carotol | 5 | 0.16 ± 0.06 | 0.65 ± 0.05 | >1 |

[a]N is the number of replications. [b]Data are %age (mean ± SEM) biting. Minimum effective dose is ≤1% biting.

Fig. 11

Table 12. Repellent activity of DEET and carotol against *Anopheles quadrimaculatus* females in an *in vivo*, cloth patch bioassay

| Compound | N[a] | Dose (µg/cm$^2$) | | | |
|---|---|---|---|---|---|
| | | 25 | 12.5 | 6.25 | 3.125 |
| DEET | 5 | 0[b] | 0.08 ± 0.05 | 0.32 ± 0.12 | > 1 |
| Carotol | 5 | 0 | 0.12 ± 0.08 | 0.36 ± 0.12 | > 1 |

[a]N is the number of replications. [b]Data are %age (mean ± SEM) biting. Minimum effective dose is ≤1% biting.

Fig. 12

Table 13. Residual activity of DEET and combinations with carrot seed essential oil and carotol (F) in in vitro A & K bioassay

| Compound | N[c] | Percentage of females biting out of 200 in the cage |  |  |  |
|---|---|---|---|---|---|
| | | Dose (µg/cm²) | | | |
| | | 50 | 25 | 12.5 | 6.25 |
| DEET | 15 | 0[b] | 0.53 ± 0.08 | >1 | >1 |
| C. oil[a] | | 0 | 0.23 ± 0.08 | >1 | >1 |
| F | | 0 | 0.43 ± 0.08 | >1 | >1 |

| Mixture | N | Dose (µg/cm²) | | | |
|---|---|---|---|---|---|
| | | 25+25= 50 | 12.5+12.5= 25 | 6.25+6.25= 12.5 | 3.12+3.13= 6.25 |
| DEET+ C. Oil | 15 | 0 | 0.13 ± 0.06 | 0.57 ± 0.07 | >1 |
| DEET + F | | 0 | 0.1 ± 0.05 | 0.63 ± 0.08 | >1 |

[a]C. oil is carrot seed essential oil and F represents the pure compound, carotol, and the data is from A & K bioassay using 30 cm² treated surface area. [b]Data are %age (mean ± SEM) biting. Minimum effective dose is ≤ 1% biting which are 2 females out of 200 in the cage. [c]N is number of replications.

Fig. 13

Table 14. Residual activity of carrot seed essential oil and carotol (F) in direct skin application bioassay Percentage of females biting out of 500 in the cage

| Time (H) | Dose (%age) | | | | | | | |
|---|---|---|---|---|---|---|---|---|
| | 8 | | 12.5 | | 25 | | 50 | |
| | C. Oil[a] | F | C. Oil | F | C. Oil | F | C. Oil | F |
| 0 | 0[b] | 0 | 0 | 0.13 ± 0.07 | 0 | 0 | 0 | 0 |
| 0.5 | 0.13 ± 0.13 | 0.4 ± 0.12 | 0 | 0.07 ± 0.07 | 0 | 0 | 0 | 0 |
| 1 | 0.6 ± 0.0 | 0.6 ± 0.12 | 0.6 ± 0.28 | 0.27 ± 0.26 | 0.27 ± 0.13 | 0.67 ± 0.07 | 0 | 0.2 ± 0.12 |
| 1.5 | >1 | >1 | >1 | >1 | 0.93 ± 0.07 | >1 | 0.33 ± 0.07 | 0.47 ± 0.13 |
| 2 | >1 | >1 | >1 | >1 | >1 | >1 | 0.73 ± 0.18 | 0.73 ± 0.27 |
| 2.5 | >1 | >1 | >1 | >1 | >1 | >1 | >1 | >1 |

[a]C. oil is carrot seed essential oil and F represents the pure compound, carotol. [b]Data are %age (mean ± SEM) biting. Minimum effective dose is ≤ 1% biting which are 5 females out of 500 in the cage. The data are the means of three replications done on different days.

Fig. 14

Table 15. Residual activity of carrot seed essential oil and combinations with baby oil and petroleum jelly in direct skin application bioassay

| Time (H) | Percentage of females biting out of 500 in the cage ||||
| --- | --- | --- | --- |
| | Dose (%age) ||||
| | C. Oil | C. Oil + PJ* | C. Oil + BO** |
| | 12.5% | 12.5% (Applied on PJ) | 12.5% (1:1 ratio) |
| 0 | 0.0 ± 0 | 0.0 ± 0 | 0.0 ± 0 |
| 0.5 | 0.13 ± 0.2 | 0.13 ± 0.2 | 0.0 ± 0 |
| 1 | 0.6 ± 0.28 | 0.13 ± 0.2 | 0.07 ± 0.14 |
| 1.5 | >1 | 0.2 ± 0.23 | 0.2 ± 0.23 |
| 2 | >1 | 0.73 ± 0.26 | 0.73 ± 0.26 |
| 2.5 | >1 | >1 | >1 |

*Petroleum jelly (PJ) was applied to the skin and then the surface was treated with the carrot seed essential oil. **BO: Johnson's® Baby Oil (mineral oil + shea butter + cocoa seed butter) was mixed with the carrot seed essential oil and applied to the skin. The BO and petroleum jelly did not show any repellent activity when tested alone.

Fig. 15

Table 16A. Residual activity of DEET and combinations with carrot seed essential oil and carotol (F) in direct skin application bioassay

| Time (H) | Percentage of females biting out of 500 in the cage. Dose (%age) | | | | | |
|---|---|---|---|---|---|---|
| | DEET 1.0% | DEET + C. oil[a] (1 + 1 = 2%) | DEET + F (1 + 1 = 2%) | DEET 2.0% | DEET + C. oil (2 + 2 = 4%) | DEET + F (2 + 2 = 4%) |
| 0 | 0.3 ± 0.2[b] | 0 | 0 | 0 | 0 | 0 |
| 0.5 | 0.33 ± 0.07 | 0 | 0 | 0.07 ± 0.07 | 0 | 0 |
| 1 | >1 | 0.27 ± 0.26 | 0.4 ± 0.12 | 0.27 ± 0.13 | 0.2 ± 0.0 | 0 |
| 1.5 | >1 | 0.53 ± 0.29 | >1 | >1 | 0.33 ± 0.13 | 0.13 ± 0.13 |
| 2 | >1 | >1 | >1 | >1 | 0.53 ± 0.18 | 0.33 ± 0.13 |
| 2.5 | >1 | >1 | >1 | >1 | 0.6 ± 0.12 | 0.4 ± 0.0 |
| 3 | >1 | >1 | >1 | >1 | >1 | >1 |
| 3.5 | >1 | >1 | >1 | >1 | >1 | >1 |
| 4 | >1 | >1 | >1 | >1 | >1 | >1 |
| 4.5 | >1 | >1 | >1 | >1 | >1 | >1 |
| 5 | >1 | >1 | >1 | >1 | >1 | >1 |
| 5.5 | >1 | >1 | >1 | >1 | >1 | >1 |
| 6 | >1 | >1 | >1 | >1 | >1 | >1 |
| 6.5 | >1 | >1 | >1 | >1 | >1 | >1 |
| 7 | >1 | >1 | >1 | >1 | >1 | >1 |
| 7.5 | >1 | >1 | >1 | >1 | >1 | >1 |

[a]C. oil is carrot seed essential oil and F represents the pure compound, carotol. [b]Data are %age (mean ± SEM) biting. Minimum effective dose is ≤ 1% biting which are 5 females out of 500 in the cage. The data are the means of three replications done on different days.

Fig. 16A

Table 16B. Residual activity of DEET and combinations with carrot seed essential oil and carotol (F) in direct skin application bioassay

| Time (H) | Percentage of females biting out of 500 in the cage. Dose (%age) | | | | | | |
|---|---|---|---|---|---|---|---|
| | DEET | DEET + C. oil[a] | DEET + F | DEET | DEET + C. oil | DEET + F | DEET |
| | 4.0% | (4 + 4 = 8%) | | 8.0% | (4.2 + 8.3 = 12.5%) | (4+8.3=12.5%) | 12.5% |
| 0 | 0[b] | 0 | 0 | 0 | 0 | 0 | 0 |
| 0.5 | 0 | 0 | 0 | 0 | 0 | 0 | 0 |
| 1 | 0 | 0 | 0 | 0 | 0 | 0 | 0 |
| 1.5 | 0.13 ± 0.13 | 0 | 0 | 0 | 0 | 0 | 0 |
| 2 | 0.73 ± 0.18 | 0 | 0 | 0 | 0 | 0 | 0 |
| 2.5 | >1 | 0 | 0 | 0 | 0.07 ± 0.07 | 0.07 ± 0.07 | 0 |
| 3 | >1 | 0 | 0 | 0 | 0.07 ± 0.07 | 0.13 ± 0.07 | 0 |
| 3.5 | >1 | 0.07 ± 0.07 | 0.27 ± 0.07 | 0.13 ± 0.13 | 0.07 ± 0.07 | 0.27 ± 0.07 | 0 |
| 4 | >1 | 0.2 ± 0.12 | 0.4 ± 0.12 | 0.0 ± 0.0 | 0.07 ± 0.07 | 0.33 ± 0.07 | 0 |
| 4.5 | >1 | 0.27 ± 0.18 | 0.53 ± 0.07 | 0.4 ± 0.23 | 0.13 ± 0.07 | 0.33 ± 0.13 | 0 |
| 5 | >1 | 0.47 ± 0.13 | >1 | 0.73 ± 0.3 | 0.2 ± 0.12 | 0.47 ± 0.07 | 0 |
| 5.5 | >1 | 0.73 ± 0.18 | >1 | >1 | 0.27 ± 0.07 | 0.73 ± 0.18 | 0 |
| 6 | >1 | >1 | >1 | >1 | 0.33 ± 0.07 | 0.87 ± 0.13 | 0.13 ± 0.07 |
| 6.5 | >1 | >1 | >1 | >1 | 0.53 ± 0.13 | 0.93 ± 0.07 | 0.27 ± 0.27 |
| 7 | >1 | >1 | >1 | >1 | 0.6 ± 0.2 | >1 | 0.53 ± 0.24 |
| 7.5 | >1 | >1 | >1 | >1 | >1 | >1 | >1 |

[a]C. oil is carrot seed essential oil and F represents the pure compound, carotol. [b]Data are %age (mean ± SEM) biting. Minimum effective dose is ≤ 1% biting which are 5 females out of 500 in the cage. The data are the means of three replications done on different days.

Fig. 16B

Table 17. Residual activity of Picaridin and combinations with carrot seed essential oil in direct skin application bioassay.

| Time (H) | Piricaridn + C. oil[a] (2+2=4%) | Picaridin 4% | Piricaridn + C. oil (4+4=8%) | Piricaridn + C. oil (4.2+8.3=12.5%) | Picaridin 8% | Picaridin 12.5% |
|---|---|---|---|---|---|---|
| 0 | 0.13 ± 0.13[b] | 0.33 ± 0.07 | 0 | 0 | 0.2 ± 0.0 | 0 |
| 0.5 | >1 | 0.67 ± 0.07 | 0 | 0.07 ± 0.07 | 0.33 ± 0.07 | 0 |
| 1 | >1 | >1 | 0.27 ± 0.18 | 0.4 ± 0.0 | 0.67 ± 0.07 | 0 |
| 1.5 | >1 | >1 | 0.47 ± 0.18 | 0.53 ± 0.07 | >1 | 0.13 ± 0.07 |
| 2 | >1 | >1 | >1 | >1 | >1 | 0.27 ± 0.07 |
| 2.5 | >1 | >1 | >1 | >1 | >1 | 0.27 ± 0.07 |
| 3 | >1 | >1 | >1 | >1 | >1 | 0.33 ± 0.13 |
| 3.5 | >1 | >1 | >1 | >1 | >1 | 0.53 ± 0.2 |
| 4 | >1 | >1 | >1 | >1 | >1 | >1 |

[a]C. oil is carrot seed essential oil and F represents the pure compound, carotol. [b]Data are %age (mean ± SEM) biting. Minimum effective dose is ≤ 1% biting which are 5 females out of 500 in the cage. The data are the means of three replications done on different days.

Fig. 17

Table 18. Residual activity of DEET and combinations with geranium (*Pelargonium graveolens*) and lemon eucalyptus (*Eucalyptus citriodora*) essential oils in direct skin application bioassay

| Time (H) | Percentage of females biting out of 500 in the cage. | | | | |
|---|---|---|---|---|---|
| | Dose (%age) | | | | |
| | DEET | DEET + Ger. EO[a] | DEET + LE EO | DEET | DEET + Ger. EO |
| | 2.0% | 2 + 2 = 4% | 2 + 2 = 4% | 4% | 4 + 4 = 8% |
| 0 | 0[b] | 0 | 0.0 ± 0.0 | 0 | 0 |
| 0.5 | 0.07 ± 0 | 0.27 ± 0.07 | 0.2 ± 0.2 | 0 | 0 |
| 1 | 0.27 ± 0.13 | 0.33 ± 0.07 | 0.33 ± 0.13 | 0 | 0 |
| 1.5 | >1 | >1 | >1 | 0.13 ± 0.13 | 0 |
| 2 | >1 | >1 | >1 | 0.73 ± 0.18 | 0.07 ± 0.07 |
| 2.5 | >1 | >1 | >1 | >1 | 0.07 ± 0.07 |
| 3 | >1 | >1 | >1 | >1 | 0.47 ± 0.07 |
| 3.5 | >1 | >1 | >1 | >1 | >1 |
| 4 | >1 | >1 | >1 | >1 | >1 |
| 4.5 | >1 | >1 | >1 | >1 | >1 |
| 5 | >1 | >1 | >1 | >1 | >1 |
| 5.5 | >1 | >1 | >1 | >1 | >1 |
| 6 | >1 | >1 | >1 | >1 | >1 |
| 6.5 | >1 | >1 | >1 | >1 | >1 |
| 7 | >1 | >1 | >1 | >1 | >1 |
| 7.5 | >1 | >1 | >1 | >1 | >1 |

[a]Ger. EO and LE EO are the essential oils of geranium and lemon eucalyptus. [b]Data are %age (mean ± SEM) biting. Minimum effective dose is ≤ 1% biting which are 5 females out of 500 in the cage. The data are the means of three replications done on different days.

Fig. 18A

Table 18. Residual activity of DEET and combinations with geranium (*Pelargonium graveolens*) and lemon eucalyptus (*Eucalyptus citriodora*) essential oils in direct skin application bioassay.

| Time (H) | Percentage of females biting out of 500 in the cage. Dose (%age) | | | | |
|---|---|---|---|---|---|
| | DEET + LE EO[a] 4 + 4 = 8% | DEET + Ger. EO 4.2 + 8.3 = 12.5% | DEET + LE EO 4.2 + 8.3 = 12.5% | DEET 8.0% | DEET 12.5% |
| 0 | 0[b] | 0 | 0 | 0 | 0 |
| 0.5 | 0 | 0 | 0 | 0 | 0 |
| 1 | 0 | 0 | 0 | 0 | 0 |
| 1.5 | 0 | 0.2 ± 0.2 | 0.07 ± 0.07 | 0 | 0 |
| 2 | 0.2 ± 0.12 | 0.53 ± 0.18 | 0.27 ± 0.18 | 0 | 0 |
| 2.5 | 0.93 ± 0.07 | >1 | 0.47 ± 0.18 | 0 | 0 |
| 3 | >1 | >1 | 0.67 ± 0.07 | 0 | 0 |
| 3.5 | >1 | >1 | >1 | 0.13 ± 0.13 | 0.0 ± 0.0 |
| 4 | >1 | >1 | >1 | 0.0 ± 0.0 | 0.0 ± 0.0 |
| 4.5 | >1 | >1 | >1 | 0.4 ± 0.23 | 0.0 ± 0.0 |
| 5 | >1 | >1 | >1 | 0.73 ± 0.3 | 0.0 ± 0.0 |
| 5.5 | >1 | >1 | >1 | >1 | 0.0 ± 0.0 |
| 6 | >1 | >1 | >1 | >1 | 0.13 ± 0.07 |
| 6.5 | >1 | >1 | >1 | >1 | 0.27 ± 0.27 |
| 7 | >1 | >1 | >1 | >1 | 0.53 ± 0.24 |
| 7.5 | >1 | >1 | >1 | >1 | >1 |

[a]Ger. EO and LE EO are the essential oils of geranium and lemon eucalyptus. [b]Data are %age (mean ± SEM) biting. Minimum effective dose is ≤ 1% biting which are 5 females out of 500 in the cage. The data are the means of three replications done on different days.

Fig. 18B

Table 19. Residual repellent activity of carrot seed essential oil and combinations of undecanoic acid and geranium essential oil in *in vivo* direct skin application bioassays.

| Time (H) | Percentage of females biting out of 500 in the cage — Dose (%) | | | | | |
|---|---|---|---|---|---|---|
| | C:11 | Ger. EO | C:11 + Ger. EO | C:11 + Ger. EO | C:11 + C. oil | C:11 + C. oil |
| | 12.5% | 12.5% | 6.25 + 6.25=12.5% | 6.25 + 6.25=12.5% | 6.25 + 6.25=12.5% | 12.5 + 12.5=25% |
| 0 | 0 | 0 | 0 | 0 | 0 | 0 |
| 0.5 | 0.2 ± 0.0 | 0.13 ± 0.13 | 0.27 ± 0.18 | 0.13 ± 0.07 | 0.13 ± 0.07 | 0 |
| 1 | 0.4 ± 0.0 | >1 | 0.53 ± 0.07 | 0.2 ± 0..12 | 0.2 ± 0..12 | 0 |
| 1.5 | 0.2 ± 0.0 | >1 | >1 | 0.4 ± 0.12 | 0.4 ± 0.12 | 0.27 ± 0.07 |
| 2 | >1 | >1 | >1 | 0.47 ± 0.13 | 0.47 ± 0.13 | 0.53 ± 0.18 |
| 2.5 | >1 | >1 | >1 | 0.53 ± 0.13 | 0.53 ± 0.13 | 0.47 ± 0.07 |
| 3 | >1 | >1 | >1 | 0.47± 0.07 | 0.47± 0.07 | 0.6 ± 0.02 |
| 3.5 | >1 | >1 | >1 | 0.53 ± 0.13 | 0.53 ± 0.13 | 0.73 ± 0.07 |
| 4 | >1 | >1 | >1 | 0.6 ± 0.0 | 0.6 ± 0.0 | 0.73 ± 0.07 |
| 4.5 | >1 | >1 | >1 | >1 | >1 | >1 |

[a]$C_{11:0}$ is undecanoic acid; ger. EO is the geranium essential oil and C. oil is the carrot seed essential oil. [b]The data are %age (mean ± SEM) biting. Minimum effective dose is ≤1% biting which is 5 females out of 500 in the cage. The data are the means of three replications done on different days.

Fig. 19

NATURAL PRODUCT FORMULATIONS WITH IMPROVED RESIDUAL INSECT REPELLENT/DETERRENT ACTIVITY

STATEMENT REGARDING FEDERALLY SPONSORED RESEARCH OR DEVELOPMENT

The underlying study and development of the claimed invention was supported in part by USDA/ARS Grant No. 56-6402-1-612.

BACKGROUND OF THE INVENTION

1. Field of the Invention

The present invention relates to natural products having insect repellent or deterrent activity. Bioassay-guided fractionation was utilized to find a fraction that gave biting deterrent activity like DEET. Carrot seed essential oil gave very high activity in both biting deterrent bioassays.

Determining new deterrents and repellents of mosquitoes is important to the global public health because mosquitoes transmit many disease pathogens. For example, *Aedes aegypti* L. transmits viral pathogens including yellow fever, Dengue and now Zika, all of which can cause significant human morbidity and mortality.

An estimated 500,000 people are infected annually with Dengue virus, including a large proportion of children around the world who require hospitalization each year, and approximately 2.5% of those infected die (WHO 2002, Ali et al. 2012). Dengue is a major disease, putting 40% of the world population at risk every year (Dowlathabad et al. 2009). Many species of genus *Anopheles* vector pathogens of malaria (Smallegange et al. 2005), while *Culex quinquefasciatus* Say is a vector of West Nile virus (Godsey et al. 2005).

The primary method to control mosquitoes is the use of biological and synthetic insecticides. These chemicals are very effective against mosquitoes, but the continuous and extensive use of these chemicals has created problems of resistance against many currently-used commercial pyrethroids (Chandre et al. 1999).

Therefore, there is an urgent need to search and identify new effective alternatives to known insecticides to control these vectors. The search for new alternatives and environmentally-friendly compounds that are effective and generate minimal resistance, such as natural products and metabolites of plant origin, constitutes important research materials to be explored for use in management of disease vectors.

Insects that can be vectors include any member of a large group of invertebrate animals characterized, in the adult state (non-adult insect states include larva and pupa), by division of the body into head, thorax, and abdomen, three pairs of legs, and often (but not always), two pairs of membranous wings. This definition therefore includes a variety of biting insects (e.g., ants, bees, black flies, chiggers, fleas, green head flies, mosquitoes, stable flies, ticks, wasps), wood-boring insects (e.g., termites), noxious insects (e.g., houseflies, cockroaches, lice, roaches, wood lice), and household pests (e.g., flour and bean beetles, dust mites, moths, silverfish, weevils).

A host is any plant or animal affected by insects. Typically, hosts are insect-acceptable food sources or insect-acceptable habitats. An insect susceptible article is any item of commerce created by man which is affected by insects. This may include buildings, furniture and the like. Typically, these articles of manufacture are insect-acceptable food sources or insect-acceptable habitats.

The terms "insect repellent," "insect repellent composition" or "repellent composition" refer to a compound or composition that deters insects from their preferred hosts or insect-suitable articles of manufacture. Most known repellents are not active poisons at all, but rather, prevent damage to plants/animals or articles of manufacture by making insect food sources or living conditions unattractive or offensive. Typically, an insect repellent is a compound or composition that can be either topically applied to the host, or is a compound or composition that may be incorporated into an insect susceptible article to produce an insect repellent article that deters insects from the nearby 3-dimensional space in which the host or article exists. In either case, the effect of the insect repellent is to drive the insects away from or to reject (1) the host, thereby minimizing the frequency of insect "bites" to the host; and/or (2) the insect susceptible article, thereby protecting the article from insect damage. Repellents may be in the form of gases (olfactory), liquids, or solids (gustatory).

An insect repellent is any compound or composition that deters insects from a host. It will be appreciated that such usage makes no distinction among compounds that have highly ephemeral effects as compared to those that exhibit long-term beneficial effects, and/or those that require very high surface concentrations before there is an observable effect on insect behavior.

2. Discussion of Known Art

Insect repellents play an important role in reduction of disease incidence by preventing the infected mosquito from biting human beings. To combat mosquitoes, a mosquito repellent is preferably used because it is relatively free from harm to a human body, compared to other mosquito-control methods that use mostly toxic pesticides.

Repellents are commonly used to protect mammals and human beings from the bites of mosquitoes and other vectors like ticks. Repellents prevent these vectors from biting human beings in many ways, including paralyzing sensory organs that prevents a mosquito from tracing the skin odors or prevents the biting because of physical contact with the repellent. Many repellents, both from natural and synthetic origins, have been developed and are being sold in the market. DEET is a synthetic repellent that has been in use for more than 60 years.

DEET is very effective, and most of the formulations of the repellents sold in the market today contain this compound as an essential part. However, since the DEET component has an unpleasant odor and strong penetration into the skin, which would be potentially harmful to humans, the use of DEET has been restricted from application on children, pregnant women, people with sensitive skin and so on. New research efforts are being made to find an alternative to DEET, especially from natural sources, that will replace this compound. In view of these problems, researchers are making efforts to find safe alternatives to DEET.

The disclosure in International Publication No. WO 2008056365 A3 relates to pediculicidal, pesticidal or insecticidal compositions containing carrot seed oil, which may be used against human or animal body lice. Some materials may be repellents and cidal agents, but others are not. DEET, for example, is presently the gold standard for mosquito repellency, but is not an insecticide.

SUMMARY OF THE INVENTION

A useful property of the present insect repellant/deterrent is that it provides a considerable improvement over the odor of DEET while exhibiting effective insect repellency. The compounds and compositions of this invention possess a pleasant fragrance. The fragrance notes of the present materials make them useful in imparting, altering, augmenting or enhancing the overall olfactory component of an insect repellent composition or article, for example, by utilizing or moderating the olfactory reaction contributed by one or more other ingredients in the composition. Specifically, the compositions of the invention may be utilized to either mask or modify the odor contributed by other ingredients in the formulation of the final repellent composition or article, and/or to enhance consumer appeal of a product by imparting a characteristic perfume or aroma.

An insect repellent composition can be used as a component of an insect repellent article, wherein an insect repellent article is an article of manufacture possessing insect repellency that is enhanced, altered, or augmented by the presence thereon or therein of an insect repellent composition. As used herein with respect to insect repellency, the terms "alter" and "modify" in their various forms refer to a means of supplying or imparting insect repellency to a composition, or augmenting the existing insect repellency characteristics where natural repellency is deficient in some regard, or supplementing the existing insect repellency to modify its quality or character. The term "enhance" is intended to mean the intensification (without effecting a change in kind or quality of repellency) of one or more repellency properties in an insect repellent composition or insect repellent article.

The repellants/deterrents of the present invention possess unique properties of insect repellency and are particularly effective against a wide spectrum of common insect pests, including biting insects, wood-boring insects, noxious insects, and household-pests, and other insects that interfere with human society. These insects include a variety of biting insects (e.g., ants, bees, black flies, chiggers, fleas, green head flies, mosquitoes, stable flies, ticks, wasps, horn flies), wood-boring insects (e.g., termites), noxious insects (e.g., houseflies, cockroaches, lice, roaches, wood lice), and household pests (e.g., flour and bean beetles, dust mites, moths, silverfish, weevils). In the case of mosquitoes, which convey pathogenic microbes, these repellent properties are additionally effective for preventing infection with such diseases. In this invention, a variety of carriers or diluents can be used. The carrier allows the formulation to be adjusted to an effective concentration of repellant molecules.

When formulating a topical insect repellent, preferably, the repellent molecules are mixed in a dermatologically acceptable carrier. The carrier may further provide water repellency, prevent skin irritation, and/or soothe and condition skin. Factors to consider when selecting a carrier(s) for any formulation of insect repellent include commercial availability, cost, repellency, evaporation rate, odor, and stability. Some carriers can themselves have repellent properties.

For the present invention, the specific choice of a carrier, if any, to be utilized in achieving the desired intimate admixture with the final product can be any carrier conventionally used in insect repellent formulations. The carrier, moreover, should preferably also be one that will not be harmful to the environment. Accordingly, the carrier can be any one of a variety of commercially available organic and inorganic liquid, solid, or semi-solid carriers or carrier formulations usable in formulating insect repellent products.

Solid carriers which can be used in the compositions of the present invention include finely divided organic and inorganic solid materials and mixtures of well-known liquid and solid substances which can provide semi-solid carrier products, for providing effective repellency within the scope of the instant invention.

Insect repellent compositions of the present invention containing the instant repellants/deterrents may also contain adjuvants known in the art of personal care product formulations, such as, e.g., thickeners, buffering agents, chelating agents, preservatives, fragrances, antioxidants, gelling agents, stabilizers, surfactants, emollients, coloring agents, aloe vera, waxes, other penetration enhancers and mixtures thereof, and therapeutically or cosmetically active agents.

Additionally, the compositions of the present invention may also contain other adjuvants such as one or more therapeutically or cosmetically active ingredients. Exemplary therapeutic or cosmetically active ingredients useful in the compositions of the invention include, e.g., fungicides, sun screening agents, sun blocking agents, vitamins, tanning agents, plant extracts, anti-inflammatory agents, anti-oxidants, radical scavenging agents, retinoids, alpha-hydroxy acids, emollients, antiseptics, antibiotics, antibacterial agents or antihistamines, and may be present in an amount effective for achieving the therapeutic or cosmetic result desired.

Additionally, the compositions of this invention may contain one or more other additives such as, e.g., an antioxidant, an emulsion stabilizer, a preservative, a propellant, an emollient, a sunscreen agent, a surfactant, an emulsifying agent, a solubilizing agent and/or an ultraviolet light absorber.

The compositions of this invention may also include one or more materials that may function as a preservative, which would prevent or retard microbial growth and thus protect the composition (or products made therefrom) from spoilage or from inadvertent contamination by the consumer during use.

The compositions of this invention may also include one or more materials that may function as a propellant, which are chemicals used for expelling products from pressurized containers (aerosols). The functionality of a propellant depends on its vapor pressure at ambient temperature and its compressibility. Liquids or gases can be used as propellants, if the pressure developed within the container is safely below the container's bursting pressure under normal storage and use conditions.

The compositions of this invention may also include one or more materials that may function as an emollient, which is a cosmetic ingredient that maintains the soft, smooth, and pliable appearance of skin. The purpose of an emollient is to remain on the skin surface or in the stratum corneum to act as a lubricant, to reduce flaking, and to improve the skin's appearance.

The compositions of this invention may also include one or more materials that may function as a sunscreen agent.

As is conventional in the art, the desired amount of an insect repellent composition to be added to a given insect susceptible article with properties of insect repellency is determined by the nature of the product and other factors. These factors include both considerations of cost and the nature of the other ingredients in the insect repellent composition or repellent article, their amounts, and the desired repellency effect. In general, the composition of the repellent should contain sufficient amounts of active insect repellant material to be efficacious in repelling the insect from the host over a prolonged period (preferably, for a period of at least several hours).

The repellent/deterrent compositions of the present invention can be formulated without a carrier and be effective. More often, however, the insect repellent composition will include a carrier.

The compositions of the present invention may be formulated and packaged so as to deliver the product in a variety of forms including, e.g., as a solution, suspension, cream, ointment, gel, film or spray, depending on the preferred method of use. The carrier may be an aerosol composition adapted to disperse the present repellant/deterrent into the atmosphere by means of a compressed gas.

Desirable properties of a topical insect repellent article include low toxicity, resistance to loss by water immersion or sweating, low or no odor or at least a pleasant odor, ease of application, and rapid formation of a dry, tack-free surface film on the host's skin. To obtain these properties, the formulation for a topical insect repellent article should permit insect-infested animals (e.g., dogs with fleas, poultry with lice, cows with ticks, and humans) to be treated with an insect repellent composition of the present invention by contacting the skin, fur or feathers of such an animal with an effective amount of the repellent article for repelling the insect from the animal host. Thus, dispersing the article into the air or dispersing the composition as a liquid mist or fine dust will permit the repellent composition to fall on the desired host surfaces. Likewise, directly spreading of the liquid/semi-solid/solid repellent article on the host is an effective method of contacting the surface of the host with an effective amount of the repellent composition.

Embodiments of the present invention which may be used as a topical insect repellent articles, include (but are not limited to): colognes, lotions, sprays, creams, gels, ointments, bath and shower gels, foam products (e.g., shaving foams), makeup, deodorants, shampoo, hair lacquers/hair rinses, and soap compositions (e.g., hand soaps, laundry soaps and bath/shower soaps).

Where the composition of this invention is stated or described as comprising, including, containing, having, being composed of or being constituted by certain components, it is to be understood, unless the statement or description explicitly provides to the contrary, that one or more components in addition to those explicitly stated or described may be present in the composition. In an alternative embodiment, however, the composition of this invention may be stated or described as consisting essentially of certain components, in which embodiment components that would materially alter the principle of operation or the distinguishing characteristics of the composition are not present therein. In a further alternative embodiment, the composition of this invention may be stated or described as consisting of certain components, in which embodiment components other than impurities are not present therein.

In development of the present invention, thousands of samples of natural products were screened for their repellent activity, including samples of carrot seed essential oil.

DEET-free products with repellent activity are finding favor with consumers, and demand for compositions containing natural products (versus synthetic chemicals such as DEET) is increasing. The DEET-free repellent compounds require a combination of excellent repellency, high residual activity and relatively little or no toxicity to humans (or pets) and the environment. In response to these consumer demands, there is an ongoing need to develop new repellent compounds which can be obtained from, or synthesized from, natural plant materials and which are pleasant to use and harmless to humans and pets.

Carrot, *Daucus carota*, is a biennial plant that belongs to family Apiaceae. *Daucus carota* subsp. *sativus* is a root vegetable, usually orange in color, though purple, black, red, white, and yellow varieties also exist. Most of the taproot consists of a pulpy outer cortex (phloem) and an inner core (xylem). High-quality carrots have a large proportion of cortex compared to core (Rubatsky et al. 1999). Carrot is a major vegetable consumed around the globe.

Carrot is regarded as a healthy food because of the presence of high vitamin and fiber contents (Nilsson 1987). In addition to use of carrot as a vegetable, carrot seeds have medicinal properties and are used in many ways to cure certain medical conditions in human beings. In addition to seeds, essential oils from the seeds have multiple uses, including the treatment of skin conditions.

Carotol is a major compound in carrot essential oil (66.8%) and carrot seed oil (30.6%) (Ozcan and Chalchat 2007). The present invention incorporates the repellent activity of carrot seed essential oil and carotol against insects such as, for example, the yellow fever mosquito, *Ae. aegypti* L., which also transmits Zika virus, and a common malaria mosquito, *An. quadrimaculatus* Say.

Samples of carrot essential oil were purchased from Eden Garden through Amazon®.com. Carrot seed essential oil gave very high activity in both biting deterrent bioassays. Performing Gas Chromatography with Flame Ionization Detector (GC/FID) and with Mass Spectrometry (GC/MS) analysis of the oil revealed the presence of 47 compounds, mainly mono- and sesqui-terpenes. The sesquiterpene, carotol, having the following chemical structure:

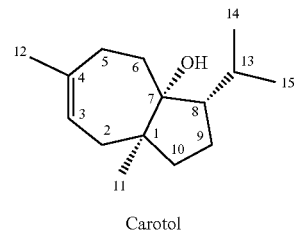 [SMILES: CC1=CC[C@]2(C)CC[C@@H](C(C)C)[C@]2(O)CC1]

Carotol constituted more than 75% w/w of the oil. The other major compounds were muurolene (4.86%), (z)-β-farnesene (2.9%) and diepicedrene (1.1%).

In the initial screening, the essential oil gave high biting deterrent activity which was comparable to DEET. Through bioassay-guided fractionation, a fraction that gave biting deterrent activity like the essential oil and the DEET was identified.

The active fraction was mainly pure carotol. In an in vitro Klun and Debboun ("K&D") bioassay, carotol gave good biting deterrent activity comparable to DEET against both *Aedes aegypti* and *Anophles quadrimaculatus* species of mosquitoes. In an in vitro Ali and Khan ("A&D") bioassay, carotol gave repellent activity comparable to DEET against *Ae. aegypti* and *Anopheles quadrimaculatus* mosquitoes. Detailed descriptions of the K&D and the A&K bioassays are described in the Materials and Method section of this application.

In the in vivo bioassays, a minimum effective dose (MED) of carrot seed essential oil and carotol was 25 µg/cm² as compared to DEET with a value of 12.5 µg/cm². Although the initial MED value (12.5 µg/cm²) for DEET was low, residual activity of the essential oil and carotol was like DEET at concentrations of 25 and 50 µg/cm², up to 120 minutes post treatment. The essential oil and carotol have the potential to be developed and used as an effective repellent against insects, for example against insects such as mosquitoes.

BRIEF DESCRIPTION OF THE FIGURES

FIG. 1 shows $^1$H and $^{13}$C nuclear magnetic resonance (NMR) spectroscopic data for carotol (CDCl$_3$, 400 MHz).

FIG. 2 shows the major components of carrot seed essential oil from GC analysis.

FIG. 3 shows the biting deterrent activity of carrot seed essential oil against *Ae. aegypti*.

FIG. 4 shows the biting deterrent activity of fractions of the carrot seed essential oil against *Ae. aegypti*.

FIG. 5 shows the biting deterrent activity of carotol against *Ae. aegypti*.

FIG. 6 shows the biting deterrent activity of carrot seed essential oil and carotol against *An. quadrimaculatus*.

FIG. 7 shows the residual repellent activity of DEET, carrot seed essential oil and carotol against *Aedes aegypti* females in an in vitro bioassay.

FIG. 8 shows the residual repellent activity of DEET, carrot seed essential oil and carotol against *Aedes aegypti* females in an in vitro bioassay.

FIG. 9 shows the repellent activity of DEET, carrot seed essential oil and carotol against *Aedes aegypti* females in an in vivo "cloth patch" bioassay.

FIG. 10 shows the residual repellent activity of DEET, carrot seed essential oil and carotol against *Aedes aegypti* females in an in vivo "cloth patch" assay.

FIG. 11 shows repellent activity of DEET and carotol against *Aedes albopictus* females in an in vivo, "cloth patch" bioassay.

FIG. 12 shows repellent activity of DEET and carotol against *Anopheles quadrimaculatus* females in an in vivo, "cloth patch" bioassay.

FIG. 13 shows residual activity of DEET and combinations with carrot oil and carotol (F) in in vitro A&K bioassay.

FIG. 14 shows residual activity of carrot oil and carotol (F) in direct skin application bioassay.

FIG. 15 shows residual activity of carrot essential oil and combinations with baby oil and petroleum jelly in direct skin application bioassay.

FIGS. 16A and 16B show residual activity of DEET and combinations with carrot essential oil and carotol (F) in direct skin application bioassay.

FIG. 17 shows residual activity of picaridin and combinations with carrot essential oil in direct skin application bioassay.

FIG. 18 shows residual activity of DEET and combinations with geranium (*Pelargonium graveolens*) and lemon Eucalyptus (*Eucalyptus citriodora*) essential oils in direct skin application bioassay.

FIG. 19 shows the residual repellent activity of carrot seed essential oil and combinations of undecanoic acid and geranium essential oil in in vivo direct skin application bioassays.

DETAILED DESCRIPTION OF THE INVENTION

Where the indefinite article "a" or "an" is used with respect to a statement or description of the presence of a component in the composition of this invention, it is to be understood, unless the statement or description explicitly provides to the contrary, that the use of such indefinite article does not limit the presence of the component in the composition to one in number.

Although illustrative embodiments of the invention will be described in detail, it is to be understood that the present invention is not limited to those precise embodiments, and that various changes and modifications can be affected therein by one skilled in the art without departing from the scope and spirit of the invention as defined by the appended claims.

1. Materials and Methods

Materials

Carrot (*Daucus carota*), geranium (*Pelargonium graveolens*) and lemon Eucalyptus (*Eucalyptus citiodora*) 100% pure therapeutic essential oils were purchased from Edens Garden, 1322 Calle Avanzado, San Clemente, Calif. DEET and undecanoic acid were purchased from Sigma-Aldrich (St. Louis, Mo.). Picaridin was purchased from Cayman Chemical (Ann Arbor, Mich.).

General Experimental Procedures

Nuclear magnetic resonance (NMR) spectra were recorded on a Bruker™ spectrometer at 400 ($^1$H NMR) and 100 MHz ($^{13}$C NMR). GC/FID analyses were carried out on a Varian™ CP-3380 gas chromatograph equipped with a Varian™ CP-8400 automatic liquid sampler, a capillary injector and flame ionization detector. The column was a 30 m×0.25 mm DB-5, 0.25µ film (J&W Scientific, Inc.). Data were recorded using a Dell® Optiplex™ GX1 computer operating with Microsoft® Windows XP® and Varian Star™ (version 6.41) workstation software. Helium was used as the carrier gas. An indicating moisture trap and an indicating oxygen trap located in the helium line from upstream to downstream, respectively, were used. Helium was used as the "make-up" gas at the detector. Hydrogen and compressed air were used as the combustion gases. The instrument parameters used for monitoring samples were: Air—30 psi (400 mL/min); Hydrogen—30 psi (30 mL/min.); column head pressure—14 psi (1.0 mL/min); split flow rate—50 mL/min; split ratio—50:1; septum purge flow rate—5 mL/min; make up gas pressure—20 psi (20 mL/min); injector temp—220° C.; detector temp—240° C.; initial oven temp—60° C.; initial temperature hold time—1 min; temperature rate—3° C./min.; final oven temperature—240° C. and final temperature hold time—4 min. A sample of 1.0 µL was injected.

GC/MS analyses were carried out on a Thermo Finnigan TRACE™ MS interfaced to a TRACE™ 2000 GC equipped with an AS2000 auto sampler and a single capillary injector, and an electron impact (EI+) source was used. High purity helium was used as the carrier gas, and a high capacity oxygen trap was located in the helium line. Dell® Optiplex™ 745 workstation operating with Microsoft® Windows XP® was used. Data were collected and processed using ThermoQuest™ Xcaliber™ software (Ver. 1.2). The column was a 30 m×0.25 mm DB-5, 0.25µ film (J&W Scientific, Inc.) with a 50:1 split injection. The injector temperature was set at 220° C., and the oven temperature programmed at 60° C. for 1 minute, then ramped to 240° C. at a rate of 3° C./minute and held at the final temperature for 4 minutes. A sample of 1.0 µL was injected.

Column chromatographic separations were performed on silica gel 60 (0.04-0.063 mm). TLC was performed on precoated TLC plates with silica gel 60 F254 (0.2 mm, Merck®). The solvent system used for TLC analysis was: n-hexane: EtOAc (95:5).

Bioassay Guided Fractionation and Isolation of Carotol

A small quantity of carrot seed oil (700 mg) was subjected to biologically guided fractionation on a Si gel column eluted with a mixture of ethyl acetate (EtOAc) and hexanes with increasing polarity of EtOAc to 5%. Seven fractions (1-7) were collected, concentrated under vacuum and submitted for biting deterrent activity. Fraction 3 showed promising biting deterrent activity. The GC/MS analysis of the active fraction indicated that this fraction contained more than 95% of carotol.

Carotol was isolated as colorless oil. The $^1$H NMR showed four methyl signals at 0.89 (d, J=6.0 Hz, Me-15), 0.97 (d, J=6.0 Hz, Me-14), 0.91 (s, Me-11), and 1.65 (s, Me-12). It also displayed an oliphenic proton at 5.29 (t, J=6.0 Hz, H-3) corresponding to carbon resonating at 122.3 ppm in the $^{13}$C NMR (Table 1/FIG. 1). The $^{13}$C NMR and DEPT-135 spectra revealed 15 signals corresponding to four methyl, five methylene, three methane and three quaternary carbons (Table 1/FIG. 1). The $^1$H and $^{13}$C NMR data were superimposed with those previously reported for carotol (Jasicka-Misiak et al. 2004). The chemical structure of carotol was confirmed by comparing its MS fragmentation pattern with the NIST library in the GC/MS.

In order to isolate more quantity of carotol and to study the possibility of the presence of more active compounds, large scale fractionation was carried out as follows:

Carrot essential oil fraction (6.0 g) was subjected to silica gel column (120 g, 5×100 cm), eluted with n-hexane/EtOAc (100:0 to 95:5). Ten fractions (1-10), 50 mL each, were collected, and similar fractions were combined based on TLC (5% EtOAc/hexanes) to give six fractions. These fractions were tested and the fractions 1-5 (4.0 g) showed good biting deterrent activity. The active fraction was re-chromatographed on Si gel CC isocratically eluted with 2% EtOAc/hexanes to yield 3.51 g of an active compound identified as carotol. Carotol was then tested against adult female mosquitoes for the biting deterrent activity. A large cage in vitro bioassay system was used to determine the repellent activity of carotol. Details of the bioassay system are given in the following section. In vivo "cloth patch" repellency bioassays were also conducted to compare the levels of repellency of carotol with DEET, which was used as a positive standard.

Insects

Adults of *Aedes aegypti* L., *Aedes albopictus* Skuse, and *Anopheles quadrimaculatus* Say used in these studies were from the laboratory colonies maintained at the Mosquito and Fly Research Unit at the Center for Medical, Agricultural and Veterinary Entomology, USDA-ARS, Gainesville, Fla. (Pridgeon et al. 2007). For biting deterrence and repellent bioassays, eggs were hatched and the insects were reared to the adult stage in the laboratory and maintained at 27±2° C. and 60±10% RH with a photoperiod regimen of 12:12 h (L:D). 8-18 day old adult females were used in these bioassays.

Mosquito Biting Bioassays

Experiments were conducted by using a six-celled in vitro Klun and Debboun (K&D) module bioassay system developed by Klun et al. (2005) for quantitative evaluation of biting deterrence. Briefly, the assay system consists of a six well reservoir with each of the 3×4 cm wells containing 6 mL of blood or feeding solution. As described by Ali et al. (2012), a feeding solution consisting of CPDA-1 and ATP was used instead of blood. Green fluorescent tracer dye (www.blacklightworld.com) was used to determine the feeding by the females. Carrot seed essential oil was initially tested to determine the biting deterrent activity. Essential oil showed strong biting deterrent activity and 7 fractions of the essential oil were further tested to identify the compound(s) responsible for this activity. The fraction, which showed the highest activity, was identified to contain more than 95% of carotol. Essential oil and carotol were further tested against *Ae. aegypti* and *An. quadrimaculatus* in this bioassay. Treatments of carrot seed essential oil at 10 μg/cm$^2$ and carotol were tested at 10 and 5 μg/cm$^2$, whereas DEET (97% N,N-diethyl-meta-toluamide) (Sigma Aldrich, St. Louis, Mo.) at 25 nmol/cm$^2$ was used as positive control. All the treatments were freshly prepared in molecular biology grade 100% ethanol (Fisher Scientific Chemical Co. Fairlawn, N.J.) at the time of bioassay.

The temperature of the solution in the reservoirs was maintained at 37° C. by continuously passing warm water through the reservoir using a circulatory bath. The reservoirs were covered with a layer of collagen membrane (Devro, Sandy Run, S.C.). The test compounds were randomly applied to six 4×5 cm areas of organdy cloth and positioned over the membrane-covered CPDA-1+ATP solution with a Teflon® separator placed between the treated cloth and the six-celled module to prevent the contamination of the module. A six-celled K&D module containing five female mosquitoes per cell was positioned over cloth treatments covering the six CPDA-1+ATP solution membrane wells, and trap doors were opened to expose the treatments to these females. The number of mosquitoes biting through organdy treatments in each cell was recorded after a 3 minute exposure, and mosquitoes were prodded back into the cells to check the actual feeding. Mosquitoes were squashed and the presence of green fluorescent tracer dye (or not) in the gut was used as an indicator of feeding. A replicate consisted of six treatments: four test compounds, DEET (a standard biting deterrent) and ethanol-treated organdy as solvent control applied randomly. Sets of 5 replications each with 5 females per treatment were conducted on 2-3 different days using newly-treated organdy and a new batch of females in each replication. Treatments were replicated 10-15 times. Proportion not biting (PNB) was calculated using the procedure described by Ali et al. (2012).

In Vitro A&K Repellent Bioassay

The A&K (Ali and Khan) bioassay system is based on the concept that the mosquitoes are attracted to warm temperatures, and this system uses warm temperature to serve as stimulus for landing and feeding. The details of the A&K bioassay systems are given in Ali et al. (2017).

In summary, this in vitro system consisted of a 30×30×30 cm collapsible aluminum cage (Model 1450B, BioQuip Products, 2321 Gladwick Street, Rancho Dominguez, Calif. 90220, USA) with metal screens. On one panel of the cage, metal screen was replaced with a clear acrylic transparent sheet. This transparent panel had a 120×35 mm slit through which the blood box containing a removable feeding device was attached. The blood box had three sides covered with acrylic sheet while the front side was open to insert the feeding device. The top of the blood box had a sliding door used to expose the females to the treatment while doing the bioassay. The sliding door served to contain the females inside the cage when the feeding device was pulled out for loading the treatment. This door was slid open when the feeding device was pushed in during the bioassay to expose the females to the treatment.

The feeding device had one 3×4 cm rectangular reservoir that contained the feeding solution. The feeding device was connected to the water circulator. The reservoir of the feeding device with feeding solution was covered with a chemical treated collagen sheet. To observe the landing and feeding of female mosquitoes, feeding solution in the reservoir was heated to match the human body temperature using a water circulator which was set at 37° C. The feeding solution had 3-4° C. higher temperature than the solid platform, and this increased temperature of the feeding solution became a better source of attraction and preference for the mosquitoes than the other parts of the feeding device. Collagen did not allow the movement of the liquid through it, and the sugars present in the feeding solution may not act as stimulus for landing and feeding of the mosquitoes. The blood box had an outside acrylic extension that served as a platform outside the cage to hold the feeding device while loading the treatment.

The rectangular reservoir of the feeding device was filled with the CPDA 1+ATP solution having a few drops of green fluorescent traceable water-soluble dye to serve as a feeding source. A test was started when the 3×4 cm marked areas of collagen were treated with the desired chemical in a volume of 50 µL/20 cm$^2$. The treated collagen sheet was then secured on the reservoir using a thin layer of high vacuum grease (Dow Corning Corporation, Midland, Mich. 48686). The feeding device was then pushed into the blood box and the sliding door was opened to expose females to the treatment. Mosquitoes landing and biting was observed for 1 minute, and the number of females that started to bite was recorded.

Stock solutions were made in ethanol. All the dilutions were made in EtOH and applied in a volume of 50 µL covering 20 cm$^2$ of the collagen sheet. Minimum effective dosage (MED) values in this in vitro bioassay were determined using a method described by Katritzky et al. (2010).

The cage contained 200±10, 8-18 day old female mosquitoes. The number of mosquitoes landing and biting were recorded visually for 1 minute. Three or four cages were used at a time, and one treatment was evaluated in a single cage. The minimum dose at which 2 or less mosquitoes (i.e. less than or equal to 1% of 200 females in the cage) started feeding in 1 minute was the minimum effective dose ("MED"). Continuous exposure of the mosquitoes in the cage can result in reduced landing and biting, therefore, 3-4 cages were used and only one replication was completed for each chemical in a single cage. To ensure accuracy of the treatment, rectangular areas of (3×4 cm (12 cm$^2$) or 7.5×4 cm (30 cm$^2$) were marked on the collagen that matched the measurement of the rectangular liquid reservoirs. Treatments were applied in a volume of 50 µL (12 cm$^2$ area) or 107 µL (30 cm$^2$ area). Treated collagen sheets were secured on a feeding reservoir containing CPDA-1+ATP solution using a thin layer of grease (Dow Corning Corp, Midland, Mich.). The feeding device was pushed inside the blood box and the sliding door was closed to expose the females to the treatment.

To ensure the normal activity (≥10% landing), control treatment was repeated after every 5 replications, and the bioassay was stopped if the response was less than the control. The data is presented as MED values with the mean percentage biting (±SEM) in parenthesis. As per the criterion, the minimum dose at which feeding was ≤1% was considered as MED. 5-10 replications were completed in a single day using a cage with 200 females.

In Vivo Mosquito Repellent Assays

Cloth patch bioassays were conducted by using in vivo bioassay system described by Katritzky et al. (2008, 2010), with minor modifications. Approximately 500 (±5%) mosquitoes, consisting primarily of females, were transferred into a test cage (45×45×45 cm) using an aspirator. A series of dosages of test compounds were tested to determine MED for repellency of the mosquitoes. MED refers to a concentration of the compound at which biting is less than or equal to 1% (i.e. less than or equal to 5 out of 500 females in the cage) during a 1 minute exposure time. A series of concentrations ranging between 6.25 to 100 µg/cm$^2$ were tested in the A&K bioassay.

A single test consisted of covering the hand of a volunteer with a soft-embossed long cuff poly glove (Atlantis Products, Mankato, Minn.), then by a powder-free latex glove (Diamond Grip, Microflex Corporation, Reno, Nev.). The arm was then covered with a knee high stocking (Leggs® Everyday Knee Highs, Winston-Salem N.C. 27102) to avoid the contact of treated muslin cloth with the skin. A plastic sleeve constructed of polyvinyl was then placed around the arm. Velcro strips were used to fix the plastic sleeve around the arm. About half-way between the wrist and elbow, a 4×7.5 cm slit in the plastic sleeve was used to assess mosquito landing and biting behavior. This opening permitted the attractive odors from the skin surface to emanate out and attract mosquitoes through this opening. During testing, this 30 cm$^2$ open area was covered with a piece of treated muslin cloth. Because of constraint of man power, only one male volunteer who was provided written informed consent participated in this study. A protocol approved by the University of Mississippi Human Use Institutional Review Board (IRB protocol #15-070) was followed.

Stock solutions with concentration of 80 µg/ul were prepared in ethanol. Concentrations ranging between 6.25 to 100 µg/cm$^2$ were selected for testing based on previous experience of the inventors with the A&K bioassay. A piece of muslin cloth measuring 8×13 cm in size was used. An area of 4×7.5 cm was marked in the center of muslin cloth. Approximately 2.5×7 cm pieces of cardboard were attached by staples on the sides of the muslin cloth. Treatments were applied to the marked area of the cloth in 215 µL volume using a pipetter. After drying, the treated muslin cloth was secured on the opening of the plastic sleeve by using an adhesive tape.

The test started when the arm with sleeve and treated muslin cloth was inserted into the mosquito cage. Mosquito landing and biting was observed for a period of 1 minute. Residual activity was determined by exposing the females to the treated muslin cloth at an interval of 30 minutes. The treated muslin patch was kept on the arm after the initial treatment and tested every half an hour thereafter.

Testing started at the highest dose (100 µg/cm$^2$) and the dose was lowered to reach the MED. Because the mosquitoes show reduced behavioral activity upon repeated exposure to repellent odors from the arm, after 5 successive exposures of the treatments, the caged mosquitoes were allowed a 15 min recovery period.

Direct Skin Application Bioassay

Direct skin application bioassays were conducted by using a powder-free latex glove (Diamond Grip, Microflex Corporation, Reno, Nev.). An opening of 3×4 cm was cut through the glove to fit on dorsal surface of the hand (FIG. 1). After wearing the glove, a wristband was used to avoid the biting on the hand near the border of the glove. Approximately, 500 (±5%), consisting primarily of females were transferred to a test cage (45×45×45 cm) using an aspirator. A series of dosages were tested to determine MED for repellency as well as residual activity against mosquitoes. A single test consisted of covering the hand of a volunteer with a powder-free latex glove and treating 12 cm$^2$ surface area, cut through the glove, on dorsal surface of the hand. Marked skin surface area was treated with the test compound in 50 µl of total volume. Because of constrain of man power, only one male volunteer who was provided with a written informed consent participated in this study. A protocol approved by the University of Mississippi Human Use Institutional Review Board (IRB protocol #15-070) was followed.

The test started when the hand treated (3×4 cm area cut through the glove on the dorsal surface) with a test compound was inserted into the mosquito cage. Mosquito landing and biting was observed for a period of 1 min. After 1 min exposure, the hand was gently shaked and the number of biting females (feeding females do not fly) was recorded. Any treatment with ≥≥5 females biting during 1 min test period was considered as "passed" whereas a treatment with ≥5 bites out of 500 mosquitoes was considered as "failed". In case of passing the next lower and in case of failure next higher serial dose was tested to reach MED. Additionally, data on the residual repellent activity was recorded by exposing the treatments to the females after every 30 minutes until the treatment failed. Carrot essential oil, carotol and DEET and the mixtures were tested.

Statistical Analysis:

Data on the PNB were analyzed using SAS Proc ANOVA (SAS Institute 2007) and means were separate using Ryan-Einot-Gabriel-Welsch multiple range test. Means and standard errors of MED values were calculated by using SAS Proc Means or Microsoft Excel 2010.

Results and Discussion

In the initial screening, the essential oil gave high biting deterrent activity which was comparable to DEET (97% purity N,N-diethyl-meta-toluamide). Through bioassay-guided fractionation, a fraction that gave activity like the essential oil and the DEET was identified. From this active fraction, the active metabolite, carotol, was isolated by chromatographic techniques. $^1$H and $^{13}$C NMR spectroscopic data for carotol ($CDCl_3$, 400 MHz) is given in Table 1/FIG. 1.

GC/FID and GC/MS analysis of carrot seed essential oil revealed the presence of 47 compounds, mainly mono- and sesquiterpenes (Table 1/FIG. 1). Carotol constituted more than 75% w/w of the essential oil. The other major compounds, as shown in Table 2/FIG. 2, were muurolene (4.86%), (z)-β-farnesene (2.9%) and diepicedrene (1.1%). There are many publications that have reported the composition of carrot oils. Ozcan and Chalchat (2007) reported carotol (66.8%), daucene (7.84%), (Z,Z)-α-faenesene (5.86%), germacrene D (2.34%), trans-α-bergamotene (2.41%) and β-selenene (2.2%) as the major contents of the carrot seed essential oil, whereas the seed oil contained carotol (30.6%), daucol (12.6%) and copaenol (0.62%) as main constituents. Maxia et al. (2009) reported only 0.7 and 1.5% of carotol in the essential oils of flowering umbels and umbels with ripe seeds of Daucus carota L. sunsp. carota collected from Portugal, whereas the essential oils from Italy had 25.1 and 2.4% carotol in similar samples. Jasicka-Misiak et al. (2004) reported 38.6% carotol in carrot seed oil purchased from Augustus Oils Ltd., London, with β-caryophyllene (10.66%), caryophyllene oxide (4.34%), α-pinene (3.94%) and farnesene (3.35%) as the other major contents. Mazzoni et al. (1999) reported carotol as the major content (73.1, 69.7 and 36.1%) in 3 commercial carrot seed essential oil samples. Flamini et al. (2014) reported 37.2, 22.0, 20.3, 24.2, 4.7, 17.5, 8.6, 6.4 and 49.8% of carotol in various samples of essential oils of seeds from 9 commercial varieties of Daucus carota L. subsp. sativus collected from various parts of Italy, whereas only 0.2% and 0% carotol was present in the flower and seed essential oils, respectively. Cu et al. (1989) reported variation in percent of carotol present in the carrot oils extracted in different solvents. They reported 13.97, 40.91, 39.06, 31.75 and 18.29% of carotol in oils extracted in methylfuran (sylvan), 1,1,2-trichloro-1,2,2-trifluoroethane (TTH), EtOH (ethanol), $CH_2Cl_2$ and hydrodistillation, respectively. Nigam and Radhakrishnan (1963) reported carotol (70%) and daucol (11.3%) as major contents of the carrot essential oil, whereas another study has reported carotol (79.5%) as a major sesquiterpene compound present in the essential oil of carrot (Gupta and Gupta 1958).

The published data suggest that the quantity of the major constituents of the carrot essential oils vary in different samples. This variation could be due to the plant parts used, variety, harvest timings, geographical location as affected by the climatic factors, genetic origin and the way the samples are prepared. Therefore, the chemical composition of the essential oil is likely to vary from sample to sample that will affect the biological properties and effectiveness of the essential oils.

Biting deterrent screening data of the carrot seed essential oil are given in Table 3/FIG. 3. Carrot seed essential oil at 10 μg/cm$^2$ showed biting deterrent activity similar to DEET at 25 nmol/cm$^2$ in the K&D bioassay. Based on this activity, this essential oil was selected for further studies. Carrot seed essential oil was fractionated into 7 fractions. These fractions were then tested for their biting deterrent activity (Table 4/FIG. 4). Screening results of these fractions indicated that the biting activity of F-3 was the highest (PNB=0.72), which was similar to DEET. Fraction F-3 was then retested to reconfirm the biting deterrent activity. A major compound identified from this fraction was carotol. This compound was further purified and tested for its activity to confirm the results of the present inventors' preliminary data (Table 5/FIG. 5). The detailed testing of carotol resulted in a proportion not biting (PNB) value (0.9) at 10 μg/cm$^2$, similar to DEET (PNB=0.85) at 25 nmol/cm$^2$, showing good biting deterrent activity. Biting deterrent activity of carotol at 5 μg/cm$^2$ with a PNB value of 0.66 was slightly lower than DEET.

Carrot seed essential oil and carotol were also tested against An. quadrimaculatus (Table 6/FIG. 6). Results from carrot seed essential oil and carotol with PNB values of 0.84 and 0.78, respectively, at 10 μg/cm$^2$, gave biting deterrent activity were similar to DEET. Biting deterrence of carotol at 25 nmol/cm$^2$ with PNB value of 0.72 was also similar to DEET at 25 nmol/cm$^2$.

In the A&K bioassay using a 12 cm$^2$ surface area, carrot seed essential oil and carotol gave repellent activity similar to DEET. The MED value for all the three treatments was 11.7 μg/cm$^2$ (Table 7/FIG. 7). In in vitro residual repellent activity, the essential oil and carotol gave activity similar to DEET at 46.9 μg/cm$^2$ up to 120 minutes post treatment (Table 8/FIG. 8). At 23.4 μg/cm$^2$, DEET showed full activity up to 120 minutes, whereas the carrot seed essential oil and carotol crossed the MED limit after 60 minutes post treatment compared to the activity of DEET at this dose. At 11.7 μg/cm$^2$, DEET was within the range of MED values up to 30 minutes, compared to the essential oil and carotol that failed at this dose.

The MED value was 25 μg/cm$^2$ for carrot seed essential oil and carotol, whereas the MED of DEET was 12.5 μg/cm$^2$ in cloth patch bioassay. In in vivo cloth patch bioassay, carrot seed essential oil and carotol showed repellency similar to DEET up to 120 minutes post treatment at the dosages of 50 and of 25 μg/cm$^2$ (Table 9/FIG. 9). In residual repellent activity study, carrot essential oil and carotol gave activity like DEET at the dosages of 50 and 25 μg/cm$^2$ up to 120 minutes post treatment (Table 10/FIG. 10). At 12.5

µg/cm², both carrot seed essential oil and carotol failed, whereas DEET lost its activity at 30 minutes post treatment. Data from the in vivo cloth patch bioassay on DEET corroborates the findings of Ali et al. (2012), and Katritzky et al. (2010), who reported MED values of 9 µg/cm², respectively. Results of the carrot seed essential oil and carotol are reported here for the first time.

In conclusion, carrot seed essential oil and its major compound, carotol, showed very high biting deterrent activity in the high throughput bioassay. In large cage in vitro and in vivo repellent bioassays, the natural products also showed an excellent repellent activity. Similarly, in in vitro and in vivo cloth patch bioassays, both the essential oil and carotol gave excellent residual repellent activity at the dosages comparable to DEET. This is the first report on the biting deterrent and repellent activity of carrot seed essential oil and carotol against mosquitoes.

2. Direct Skin Application Bioassay.

Direct skin application bioassays were conducted by using a powder-free latex glove (Diamond Grip™, Microflex Corporation, Reno, Nev.). An opening of 3×4 cm was cut through the glove to fit on the dorsal surface of the hand. After donning the glove, a wristband was used to avoid biting on the hand near the border of the glove. Approximately 500 (±5%) mosquitoes, consisting primarily of females, were transferred to a test cage (45×45×45 cm) using an aspirator. A series of dosages were tested to determine MED for repellency as well as residual activity against mosquitoes.

A single test consisted of covering the hand of a volunteer with a powder-free latex glove and treating a 12 cm² surface area, cut through the glove, on the dorsal surface of the hand. Marked skin surface area was treated with the test compound in 50 µl of total volume. Because of constraints of man power, only one male volunteer who was provided with a written informed consent participated in this study. A protocol approved by the University of Mississippi Human Use Institutional Review Board (IRB Protocol #15-070) was followed.

The test started when the hand treated (3×4 cm area cut through the glove on the dorsal surface) with a test compound was inserted into the mosquito cage. Mosquito landing and biting was observed for a period of 1 min. After 1 min exposure, the hand was gently shaked and the number of biting females (feeding females do not fly) was recorded. Any treatment with ≤5 females biting during the 1 min test period was considered as "passed", whereas a treatment with ≥5 bites out of 500 mosquitoes was considered as "failed". In case of passing, the next lower, and in case of failure, the next higher, serial dose was tested to reach MED. Additionally, data on the residual repellent activity were recorded by exposing the treatments to the females after every 30 minutes until the treatment failed. Carrot seed essential oil, carotol, geranium and lemon Eucalyptus essential oils, DEET, picaridin and the mixtures were tested.

Results and Discussion

In vivo, cloth patch bioassay data against Ae. albopictus are given in Table 11/FIG. 11. A MED value of DEET and carotol was 12.5 µg/cm². The value of DEET against Ae. albopictus was similar, whereas a MED value of carotol was lower (25 µg/cm²) than Ae. aegypti (Table 9/FIG. 9).

In vivo cloth patch bioassay data against Anopheles quadrimaculatus are given in Table 12/FIG. 12. A MED value of DEET and carotol was 6.25 µg/cm². A MED value against An. quadrimaculatus in both DEET and carotol is lower than Ae. aegypti (DEET=12.5 and carotol=25 µg/cm², respectively) or Ae. albopictus, with MED value of 12.5 µg/cm².

In the A&K bioassay, mixtures of DEET with the essential oil or carotol showed a MED value of 12.5 µg/cm² (6.25+6.25=12.5 µg/cm²), which is one half of the dose of individual compounds, and was significantly lower than the individual applications of DEET, carrot seed essential oil or carotol, with a MED value of 25 µg/cm² (Table 13/FIG. 13). Amounts of the individual components in the mixture were ¼ of the MED value of individual compounds. In in vivo direct skin application bioassay, both the essential oil and carotol at 8, 12.5, 25 and 50% application rates were active, and reached to the MED values at 1.5, 1.5, 2 and 2.5-h post application, respectively (Table 14/FIG. 14).

In direct skin application bioassays, mixtures of petroleum jelly and Johnson's® baby oil with the essential oil increased the residual activity by 100% at the application rate of 12.5% (Table 15/FIG. 15). These data indicated that improvement in formulations can make these natural products as effective commercial repellents.

Data on the repellent activity of mixtures of DEET with carrot essential oil and carotol are given in Table 16/FIGS. 16A, 16B. These mixtures of DEET with the essential oil and carotol showed very promising results in direct skin application bioassay. All the mixtures were active, and showed a substantial increase in residual repellent activity at lower dosages when compared to various treatments used alone. DEET at 1% rate of application crossed the MED level at 1-h post application, whereas the addition of 1% carrot essential oil or carotol increased the residual repellent activity by 100%. There was a 33% increase in residual activity when the activity of 1+1=2% mixtures were compared with 2% of DEET alone. Addition of 2% essential oil or carotol in 2% DEET increased the residual repellent activity by 100% (1.5-h), whereas this increase was 25% when the mixture was compared with the MED value of 4% DEET. Mixture of 4% of the essential oil or carotol with 4% DEET increased residual activity by 175% (3.5-h) when compared with the MED value of 4% DEET, whereas the residual repellent activity of this mixture was similar to 8% application rate of DEET. Mixture of 8.3% of the essential oil or carotol with 4.2% DEET increased the residual activity by 225-250% (4.5-5-h), 30-40% (1.5-2-h) and 0%, when compared to 4%, 8% and 12.5% treatment of DEET, respectively. These data indicated a strong potential of these natural products to substantially increase the residual activity of DEET in mixtures at low concentrations.

Data on the residual repellent activity of picaridin and its mixtures with carrot seed essential oil in direct skin application bioassay are given in Table 17/FIG. 17. There was 100% increase in the residual activity in a 4%+4% mixture of picaridin and carrot seed essential oil, when compared to 4% or 8% application rates of picaridin alone. However this increase in residual activity was lower as compared to DEET (Table 16/FIGS. 16A, 16B).

Data on the repellent activity of mixtures of DEET with the essential oils of geranium (Pelargonium graveolens) and lemon Eucalyptus (Eucalyptus citriodora) in a direct skin application bioassay are given in Table 18/FIG. 18. The mixtures of DEET with these essential oils did not show any promising results in a direct skin application bioassay. Combinations of these essential oils with DEET did not show much increase in residual repellent activity. DEET at 2% rate of application crossed the MED level at 1-h post application, and addition of 2% of any of these two essential oils did not improve the residual repellent activity. There was unsubstantiated improvement in residual activity when 4% DEET was mixed with 4 and 8.3% of these essential oils. The data indicated that these essential oils do not have any synergistic activity in mixtures.

In order to determine synergy in mixtures, two essential oils that are reported to show repellency for mixtures were selected and tested. The data did not show any improvement in residual activity when geranium or lemon *Eucalyptus* essential oil was mixed with DEET and undecanoic acid. However, in the mixture of carrot seed essential oil with DEET, picaridin or undecanoic acid residual activity increased, significantly.

Regarding Table 19/FIG. 19, a direct skin application method was used in this study, using the methodology described above. Data on the residual repellent activity of undecanoic acid and its mixtures with geranium essential oil and carrot seed essential oil in direct skin application bioassay are given in Table 19/FIG. 19. Undecanoic acid at 12.5% crossed MED level at 1.5-h post application, whereas geranium essential oil at 12.5% lasted for 1-h. Mixture of undecanoic acid with geranium essential oil at 12.5% (6.25+6.25=12.5%) did not improve the residual repellant activity. Mixture of undecanoic acid with carrot seed essential oil at 12.5% (6.25+6.25=12.5%) increased residual activity by 125% when compared to undecanoic acid alone at 12.5%. However, there was no increase in residual activity when the mixture of undecanoic acid with carrot seed essential oil at 25% (12.5+12.5=25%) was compared with a mixture of 12.5%. These data indicated a synergistic activity in the mixture of undecanoic acid with carrot seed essential oil.

Summary

In conclusion, carrot seed essential oil and its major compound, carotol, showed excellent biting deterrent activity in the high throughput bioassay. In the in vitro A&K bioassay and an in vivo repellent bioassay, these natural products showed excellent repellent activity. Similarly, in in vitro and in vivo cloth patch bioassays, both the essential oil and carotol gave very promising residual repellent activity at dosages comparable to DEET. The data on the mixtures of DEET with the carrot seed essential oil and carotol showed extended residual repellency when compared to essential oil, carotol or DEET alone. Repellency of the mixtures in direct skin application is very promising, and indicated that mixtures of these natural products with DEET can decrease the amount of DEET required for efficacy and increase residual repellent activity.

A synergistic effect of carrot seed essential oil was also observed in mixtures with picaridin. Synergy with DEET and picaridin is a unique characteristic of carrot seed essential oil and carotol which is not present in other active essential oils like geranium and lemon *Eucalyptus*.

This is the first report on the biting deterrent and repellent activity of carrot seed essential oil and carotol against mosquitoes. These data strongly suggest that synergy of carrot seed essential oil and carotol in mixtures with DEET or picaridin presents a strong potential of these natural products to be developed as commercial repellents against mosquitoes. Increase in residual repellency when these products were mixed with petroleum jelly and mineral oil as carriers indicated a potential for these natural products to be used as commercial natural repellents in standard or optimized formulations.

A major commercial advantage of carrot essential oil is that it is commercially available, biodegradable, and safe. Carrot essential oil is on the Food and Drug Administration's GRAS list and is used commercially in cosmetic formulations. Carotol, which is the major component of the essential oil, is likely to be safe for application to the skin and can be economically extracted from the essential oil.

The above description is only representative of illustrative embodiments and examples. For the convenience of the reader, the above description has focused on a limited number of representative examples of all possible embodiments, examples that teach the principles of the invention. The description has not attempted to exhaustively enumerate all possible variations or even combinations of those variations described. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments involve differences in technology and materials rather than differences in the application of the principles of the invention. Accordingly, the invention is not intended to be limited to less than the scope set forth in the following claims and equivalents.

REFERENCES

Ali, A., C. L. Cantrell, U. R. Bernier, S. O. Duke, J. C. Schneider, and I. Khan. 2012. *Aedes aegypti* (Diptera: Culicidae) biting deterrence: structure-activity relationship of saturated and unsaturated fatty acids. J. Med. Entomol. 49: 1370-1378.

Chandre, F., F. Daffier, L. Manga, M. Akogbeto, O. Faye, J. Mouchet, and P. Guille. 1999. Status of pyrethroid resistance in *Anopheles gambiae* sensu lato. Bull. WHO 77: 230-234.

Cu, J-Q, F. Perineau, M. Delmas and A. Gaset. 1989. Comparison of the chemical composition of carrot seed essential oil extracted by different solvents. Flavour and Fragrance Journal 4:225-231.

Dowlathabad, M. R., G. S. Jyothi, R. M. Reddy, Prasad, M. V. V. and K. Subramanyam. 2009. Larvicidal activity of essential oils from Indian medicinal plants against *Aedes aegypti* L. J. Pharm. Res. 2:762-764.

Flamini G, E. Cosimi, P. L. Cioni, I. Molfetta, and A. Braca. 2014. Essential oil composition of carrot seeds *Daucus carota* ssp. *major* (Pastinocello carrot) and nine different commercial varieties of *Daucus carota* ssp. savitus fruits. Chemistry and Biodiversity. 11: 1022-1033.

Godsey, M. S., M. S. Blackmore, N. A. Panella, K. Burkhalter, K. Gottfried, L. A. Halsey, R. Rutledge, S. A. Langevin, R. Gates, K. M. Lamonte, A. Lambert, R. S. Lanciotti, C. G. M. Blackmore, T. Loyless, L. Stark, R. Oliveri, L. Conti, and N. Komar. 2005. West Nile Virus epizootiology in the Southeastern United States 2001. Vector-Borne and Zoonotic Dis. 5: 82-89. doi:10.1089/vbz.2005.5.82.

Gupta G. N. and J. C. Gupta. 1958. Chemical examination of carrot-seed oil. J. Proc. Oil Technologists' Assoc., India, Kanpur (1958), 12(No. 11), 119-23.

Katritzky, A. R., Z. Wang, S. Slavov, M. Tsikolia, D. Dobchev, N. G. Akhmedov, C. D. Hall, U. R. Bernier, G. G. Clark, and K. J. Linthicum. 2008. Synthesis and bioassay of novel mosquito repellents predicted from chemical structure. Proc Nat Acad Sci U.S.A.; 105, 7359-7364.

Katritzky, A. R., Z. Wang, S. Slavov, D. A. Dobchev, C. D. Hall, M. Tsikolia, U. R Bernier, N. M. Elejalde, G. G Clark, and K. J. Linthicum. 2010. Novel carboxam ides as potential mosquito repellents. J. Med. Entomol. 47: 924-938.

Klun, J. A., M. Kramer, and M. Debboun. 2005. A new in vitro bioassay system for discovery of novel human-use mosquito repellents. J. Am. Mosq. Control Assoc. 21: 64-70.

Maxia A., B. Marongo, A. Piras, S. Porcedda, E. Tuveri, M. J. Goncalves, C. Cavaleiro and L. Salgueiro. 2009. Chemical characterization and biological activity of essential oils from *Daucus carota* subsp. *carota* growing wild on the Mediterranean coast and the Atlantic coast. Fitoterapia. 80: 57-61.

Mazzoni V., F. Tome and J. Casanova. 1999. A daucane-type sesquiterpene from *Daucus carota* seed oil. Flavour Fragr. J. 14:268-272.

Nigam, S. S. and C. Radhakrishnan. 1963. Chemical examination of the essential oil from the seeds of *Daucus careta*. Perfumery and Essential Oil Record. 54, 87-92.

Nilsson, T. 1987. Carbohydrate composition during long term storage of carrots as influenced by the time of harvest. J. Hort. Sci. 62, 191-203.

Ozcan M. M. and J. C. Chalchat. 2007. Chemical composition of carrot seeds (*Daucus carota* L.) cultivated in Turkey: characterization of the seed oil and essential oil. GRASAS Y ACEITES, 58: 359-365.

Pridgeon, J. W., K. M. Meepagala, J. J. Becnel, G. G. Clark, R. M. Pereira, and K. J. Linthicum. 2007. Structure-activity relationships of 33 piperidines as toxicants against female adults of *Aedes aegypti* (Diptera: Culicidae). J. Med. Entomol. 44: 263-269

Rubatsky, V. E.; C. F. Quiros, and P. W. Siman. 1999. Carrots and related vegetable umbelliferae. CABI Publishing.

Smallegange, R. C., Y. T. Qui, J. J. A. van Loon, and W. Takken. 2005. Synergism between ammonia, lactic acid and carboxylic acids as kairomones in the host seeking behavior of the malaria mosquito *Anopheles gambiae* sensu stricto (Diptera: Culicidae). Chem. Senses 30: 145-152.

WHO (2002). Dengue and Dengue Haemorrhagic Fever. http://www.who.int/mediacentre/factsheets/fs117/en/.

The invention claimed is:

1. A mosquito repellent/deterrent comprising a mosquito repellant/deterrent amount of at least one of carrot seed essential oil or carotol and mixtures thereof further comprising DEET said deterrent being either alone or in an acceptable carrier therefor, wherein, in the case of mosquitoes that are vectors of disease causing pathogenic microbes, the repellent/deterrent is additionally effective for preventing infection with such diseases.

2. The mosquito repellent/deterrent according to claim 1, further comprising undecanoic acid.

3. A method for protecting individuals from mosquito bites comprising applying to an individual a mosquito repellent/deterrent according to claim 1.

4. The method for protecting individuals from mosquito bites comprising applying to an individual a mosquito repellent/deterrent according to claim 2.

5. An insect repellent/deterrent comprising an insect repellant/deterrent amount of at least one of carrot seed essential oil or carotol and mixtures thereof and DEET, the repellent/deterrent being either alone or in an acceptable carrier therefor.

6. The insect repellant/deterrent according to claim 5, further comprising undecanoic acid.

* * * * *